Jan. 12, 1932.  E. H. BRISTOL  1,840,830
CHART HOLDER FOR RECORDING INSTRUMENTS
Original Filed June 6, 1925
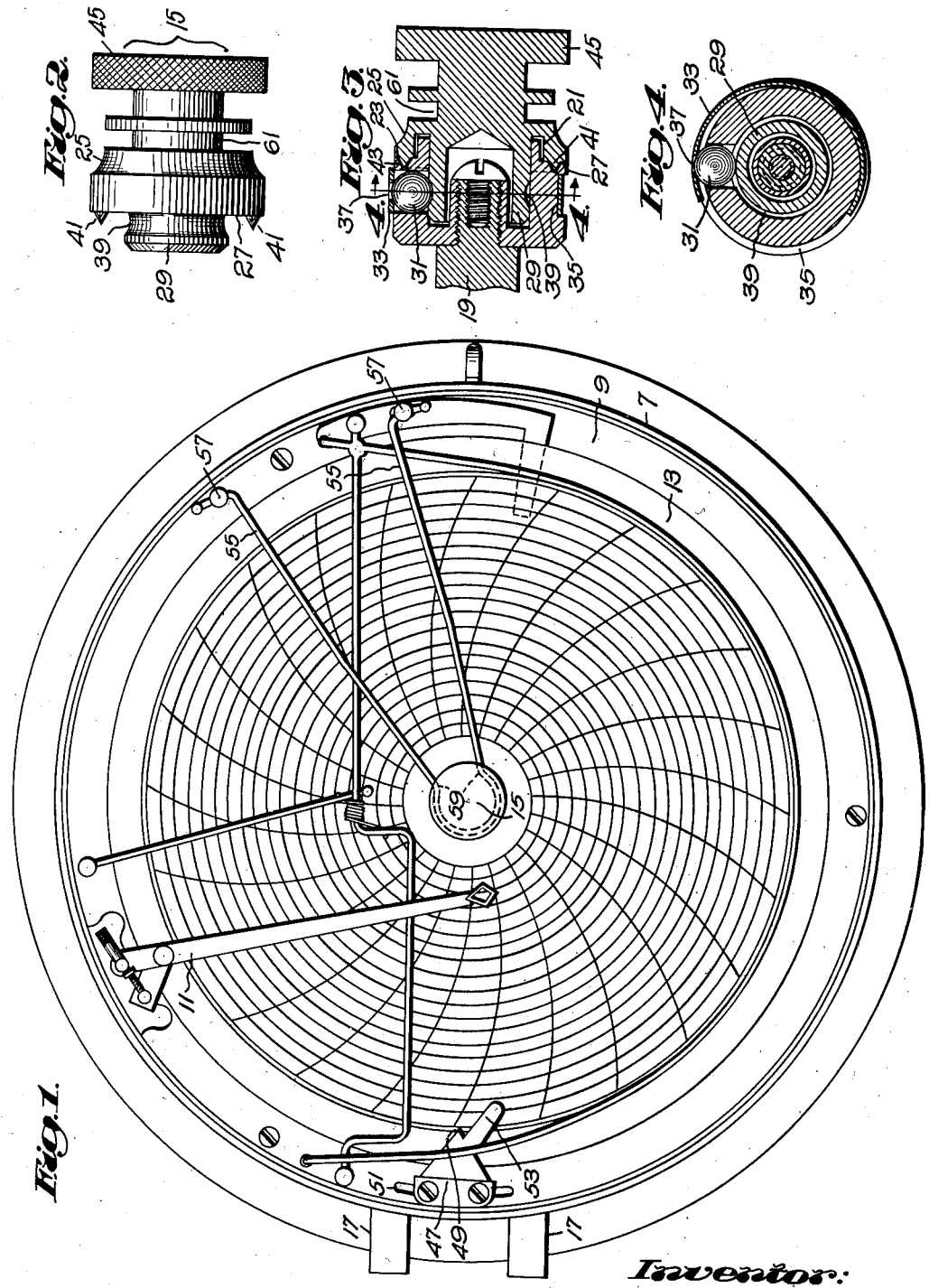

Patented Jan. 12, 1932

1,840,830

UNITED STATES PATENT OFFICE

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS

CHART HOLDER FOR RECORDING INSTRUMENTS

Original application filed June 6, 1925, Serial No. 35,352. Divided and this application filed April 17, 1930. Serial No. 444,972.

This invention relates to recording instruments such, for example, as recording pressure gages and recording thermometers, and more particularly to the mechanism for supporting the usual changeable paper chart or record disc used on such instruments, and aims to make the use of the instruments more convenient and the records more accurate.

This application is a division of my application Serial No. 35,352, filed June 6, 1925.

My invention will best be understood by reference to the following description of the recording instrument shown by way of example in the accompanying drawings in which structures illustrative of my invention are embodied. In these drawings:—

Fig. 1 is a front elevation of a recording instrument, the usual glazed door being omitted;

Fig. 2 is an enlarged side elevation of the cap of the chart holding hub;

Fig. 3 is an enlarged central section of the chart holding hub; and

Fig. 4 is a section on the line 4—4 of Fig 3.

Referring to the drawings, I have there shown a recording instrument of well known form embodying a casing 7, the front of which is closed by a dial plate 9 and which houses a suitable clock movement and a suitable measuring instrumentality such, for instance, as a helical Bourdon tube or a set of diaphragms. The measuring instrumentality operates the pen 11 which swings over the dial plate 9 and is adapted to record the conditions measured on the paper chart 13 which is secured as by means of the chart hub 15 to the time shaft of the clock movement to rest against and rotate over the dial plate 9. The instrument would ordinarily be provided with a suitable glazed door, not shown, carried by the hinge knuckles 17.

Referring to Fig. 3, the hub 15 by which the chart is secured to the time shaft 19 may consist of an inner part secured to that shaft and an outer removable cap. The former preferably comprises a cylindrical barrel portion 21 adapted to pass through the central opening of the chart, which latter may be placed over this barrel portion freely by a simple movement of axial approach and at the inner end of this barrel portion there is provided a shoulder 23 against which the chart may be clamped to rotate with the time shaft. This clamping may be effected by the removable cap which preferably includes a sleeve 25 adapted to surround the barrel portion 21, the sleeve having an annular shoulder 27 opposing shoulder 23, the chart being clamped between these two shoulders with sufficient pressure to cause the rotation of the same with the time shaft.

To secure the removable cap embodying the sleeve 25 upon the inner member of the hub the latter may be hollowed out to receive a stem 29 on the cap, a suitable spring catch being provided for engaging the stem within the hollow of the inner element, this catch being preferably arranged to exert a longitudinal tension on the removable cap to effect a clamping pressure between the opposed shoulders 23 and 27. In the present embodiment of the invention the catch is formed by a ball 31 housed in a suitable recess in the inner element so that it projects into the hollow therein, which ball is normally pressed inwardly by a suitable spring, conveniently in the form of a flat spring 33 in extent somewhat greater than a semicircle, which clasps around the inner element of the hub, preferably being housed in an annular groove 35 therein. The end of the spring 33 bears upon the ball 31 and may be provided with a hole 37 receiving the convex surface of the ball to aid in positioning the parts. The ball may engage in a suitable recess 39 in the stem 29 of the removable cap, this recess preferably being an annular groove as shown to permit engagement of the parts irrespective of the relative angular position thereof and for other purposes which will appear hereafter. The end of the stem 29 may, as shown in Fig. 3, be provided with a coned inner end cooperating with the convex surface of the ball to provide a mutual camming action facilitating the interengagement of the parts. The rounded surface of the ball entering the groove 23 likewise tends to draw the cap toward the left in Fig. 4, pressing shoulder 27 against shoulder 23 and may grip the chart with sufficient tightness to insure proper driving of the same from the time shaft. In the preferred embodiment of the invention herein shown the single ball 31 provides a laterally acting catch tending to press stem 29 laterally (downwardly in Fig. 4) into frictional engagement with the wall of the recess in the inner hub element. By this frictional engagement driving of the cap by the inner element carried by the time shaft 19 is assured. To ensure rotation of the chart suitable means are provided whereby the cap grips the same and I have herein shown teeth 41 formed on shoulder 27 of the sleeve 25, the teeth being adapted to pierce the chart when the cap is applied.

The chart as used on these instruments is ruled with suitable lines usually designated with the hours of the day or other time periods. Obviously if a chart is placed on the instrument at nine o'clock in the morning, it should be so positioned that the pen will coincide with the nine o'clock line on the chart. In the present instance provision is made permitting angular adjustment of the chart after it has been secured in position on the time shaft. For this purpose the cap or outer member of the chart hub is arranged for rotative movement relatively to the time shaft without relaxation of the hold on the chart and means are provided whereby the chart may be rotated with this outer member or cap independently of movement of the time shaft. As has already been noted, the cap may be manually rotated relative to the inner element of the hub on the time shaft because the ball 31 engages in annular groove 39 in the stem 29 of the cap. Rotative adjustment of the cap to control the angular position of the chart is provided for by the teeth 41 formed on the shoulder 27 which pierce the chart. An annular groove 43 in the shoulder 23 of the inner member receives the teeth 41 and permits rotative movement of the sleeve. Thus, if the sleeve is rotated as by means of the enlarged head 45, the chart will likewise be rotated by the teeth 41 which grip the same yet it will be held in the position of adjustment to which it is brought by this rotation and will be rotated by the time shaft at normal speed as soon as the adjusting movement is stopped since the cap which grips the chart by means of the teeth 41 is frictionally clutched to the shaft with sufficient firmness to effect driving without slippage.

As seen in Fig. 1, the division lines on the chart indicating periods of time are closer together near the inner circumference of the chart than they are at the outer circumference. When the chart is changed the pen 11 may be as shown near the inner circumference of the chart. To facilitate adjustment of the chart to the proper time line, advantage may be taken of the larger scale at the margin of the chart and for this purpose the member 47 may be mounted on the edge of the dial plate 9 and have an indicating point 49 projecting inwardly over the edge of the chart to cooperate with the division lines adjacent the outer margin thereof, this point being located in the line of movement of the pen 11. In the embodiment of the invention shown the member 47 is mounted by means of clamping screws in a circumferential slot 51 of the dial plate 9, this providing for the initial adjustment of the member to its proper position in the line of movement of the pen. To facilitate the introduction of the chart beneath the pointer 49, which should lie closely adjacent the same, the member 47 may be provided with a finger 53 curving outwardly from the face of the dial plate, as indicated in Fig. 3, providing in cooperation therewith a guiding passage into which the edge of the chart is readily introduced to be slid to its final position under the pointer 49 which lies relatively closely adjacent the face of the chart.

The removable cap of the chart hub is preferably attached to the instrument to prevent its loss. To facilitate its application and removal and also in the present embodiment of the invention for other purposes the construction best illustrated in Fig. 1 may be adopted. I have there shown the removable cap as swivelled in the end of a wire bail having its legs 55 pivoted in posts 57 projecting from the dial plate beyond the margin of the chart. The sides of the bail adjacent the end may be pressed inwardly as indicated in dotted lines at 59 in Fig. 1 to provide a partially circular portion fitting in an annular groove 61 on the cap. The parts may be assembled by passing the cap between the legs of the bail until the groove lies substantially in the plane of the latter and then pressing it toward the end of the bail to snap past the shoulders provided by the bending thereof at the points 59. It will be well understood that the pivotal mounting of the cap by means of the bail 55 permits it either to be applied to the time shaft in the position shown in Fig. 1 or snapped free therefrom and swung to one side out of the way of the chart 13.

When the removable cap is thus applied, the sleeve 25 will press the chart home over the barrel 21 and against the shoulder 23 toward which it is pressed by the shoulder 27. When the parts are thus engaged the fingers holding the cap by means of the head 45 may be turned to rotate the cap independently of any movement of the inner member and of the time shaft and the teeth 41 engaging the chart will move the same relatively to the barrel 21 and the chart may be brought into proper position of angular adjustment after it has been applied to and secured to the time shaft. The pointer 49 facilitates getting this adjustment accurately and quickly.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. A chart hub comprising a pair of elements adapted to clamp the chart between them and capable of relative rotation without release of clamping pressure, one of said elements having means interlocking with the chart to entrain the chart on rotative adjustment of said element relative to the other element.

2. A chart hub comprising inner and outer elements adapted to receive the chart between them, a catch on one element, a groove in the other receiving the catch, and permitting a relative rotative movement of the engaged elements, and teeth on the outer element adapted to pierce the chart.

3. A chart hub comprising inner and outer elements adapted to receive the chart between them, a catch on one element, a groove in the other receiving the catch, and permitting a relative rotative movement of the engaged elements, teeth on the outer element adapted to engage the chart and a groove in the inner element receiving said teeth.

4. A chart hub comprising an inner element having a hollow cylindrical portion and an inner shoulder and an outer element having a sleeve embracing said portion and opposing the shoulder and a stem entering the cylindrical portion, means for securing said stem in the hollow portion comprising an annular groove in one element and a catch on the other element engaging the groove, and teeth on the sleeve to engage the chart.

5. A chart hub comprising an inner element having a recessed cylindrical portion and an inner shoulder and an outer element having a sleeve embracing the said portion and opposing the shoulder and a stem entering the recess and means for securing said stem comprising a groove in one element and a cooperating catch on the other, the wall of the groove and the catch cooperating to exert an axial clamping pressure on a chart received between said elements.

6. A chart hub comprising an inner element having a recessed cylindrical portion and an inner shoulder, a spring-pressed catch intersecting the recess therein and an outer element having a sleeve embracing the said portion and opposing the shoulder and a stem entering the recess having a groove to engage the catch, the wall of the groove and the catch cooperating to exert an axial clamping pressure on a chart received between said elements and said stem having a coned end to cam aside said catch when the elements are engaged.

7. A chart hub comprising a pair of elements adapted to clamp the chart between them and capable of relative rotation without release of clamping pressure, one of said elements having teeth adapted to pierce the chart and the other having a groove in which the teeth work.

8. A recording instrument comprising a time shaft and a two part element carried thereby for clamping a chart between the parts thereof, one of the parts being rotatable relative to the other without separation thereof and having means to engage and interlock with the chart.

9. A recording instrument comprising a time shaft and means for securing a chart thereto comprising a removable cap having an annular groove, a bail having legs pivoted laterally of the shaft and its sides inbent to form a partly circular portion whereby the cap may be sprung past said inbent portions from the open side of the bail and be rotatably supported by engagement of said partly circular portion in said groove.

10. A recording instrument comprising a dial plate, means for revolving a chart thereover, a pen adapted to move over the chart, a device on the dial plate having a locating point adapted to project over the margin of the chart and lie closely adjacent the same in the line of movement of the pen and a finger extending diagonally outward from the plane of the dial plate to provide a guide facilitating the insertion of the chart beneath said locating part.

11. A recording instrument comprising a time shaft, a two part element carried thereby for securing a chart, one of the parts being rotatable relatively to the other without separation thereof and having means to engage the chart to entrain the chart therewith on rotation thereof, a relatively fixed index adapted closely to overlie the margin of the chart and a finger associated with said index projecting diagonally outward from the plane of rotation of the chart to provide a guide facilitating the insertion of the chart beneath said locating part.

12. A chart hub having a cylindrical portion to receive and center the chart, a sleeve adapted to surround the cylindrical portion, yielding frictional means for securing engagement of said sleeve to the hub to be driven thereby and teeth on the sleeve to pierce the chart.

13. A chart hub having a cylindrical barrel to receive the chart, a cap for the hub having teeth to engage the chart, a stem on one part entering a recess in the other, means for securing the stem comprising a laterally acting catch providing for a frictional engagement between the stem and the wall of the recess to effect the driving of the cap from the hub, there being a circumferentially extending groove with which said catch cooperates thereby to provide for rotative adjustment of the cap and chart relatively to the hub.

14. A chart hub having a barrel over which the chart is placed, a cap comprising a sleeve fitting over the barrel having means to grip the chart and means for securing together barrel and sleeve comprising a catch effective to produce a lateral pressure between the parts whereby the sleeve may be driven from the hub.

15. A chart hub for recording instruments comprising a part to be carried by the time shaft, a cap having means to engage the chart to force the latter to turn therewith and a swivelling catch to secure the cap to the shaft-carried part effective to produce a lateral pressure between the cap and said part whereby the cap is frictionally driven from the said part.

In testimony whereof, I have signed my name to this specification.

EDGAR H. BRISTOL.